P. TURNER.
DETACHABLE STEERING WHEEL.
APPLICATION FILED OCT. 3, 1918.

1,295,640.

Patented Feb. 25, 1919.
2 SHEETS—SHEET 1.

Inventor
PAUL TURNER

By Charles E. Wiser
Attorney

P. TURNER.
DETACHABLE STEERING WHEEL.
APPLICATION FILED OCT. 3, 1918.

1,295,640.

Patented Feb. 25, 1919.
2 SHEETS—SHEET 2.

INVENTOR
PAUL TURNER
BY
ATTORNEY

UNITED STATES PATENT OFFICE.

PAUL TURNER, OF DETROIT, MICHIGAN.

DETACHABLE STEERING-WHEEL.

1,295,640.

Specification of Letters Patent.

Patented Feb. 25, 1919.

Application filed October 3, 1918. Serial No. 256,677.

*To all whom it may concern:*

Be it known that I, PAUL TURNER, a citizen of the United States, residing at Detroit, county of Wayne, State of Michigan, have invented a certain new and useful Improvement in Detachable Steering-Wheels, and declare the following to be a full, clear, and exact description of the same, such as will enable others skilled in the art to which it pertains to make and use the same, reference being had to the accompanying drawings, which form a part of this specification.

This invention relates to detachable steering wheels and its object is to provide a steering wheel for automotive vehicles that may be readily detached from the steering post. In accomplishing this object, it is necessary that the removable part—namely the wheel rim and parts adapted to connect the wheel with the steering head should be as light as possible and readily attachable or detachable. The principal novel features of the invention are therefore in the construction of a head adapted to be permanently attached to the steering post having arms to which the arms provided on the steering wheel rim may be detachably secured as is hereinafter more fully described. The particular construction of the head adapted for attachment to the steering shaft is immaterial; that is the head may be hinged or in sliding relation with the post as in some types of construction, but in any case the head of whatever character is provided with portions with which the arms of the steering wheel may be readily attached or detached. These and other objects and novel features of the invention are hereinafter more fully described and claimed and shown in the accompanying drawings in which—

Figure 1:
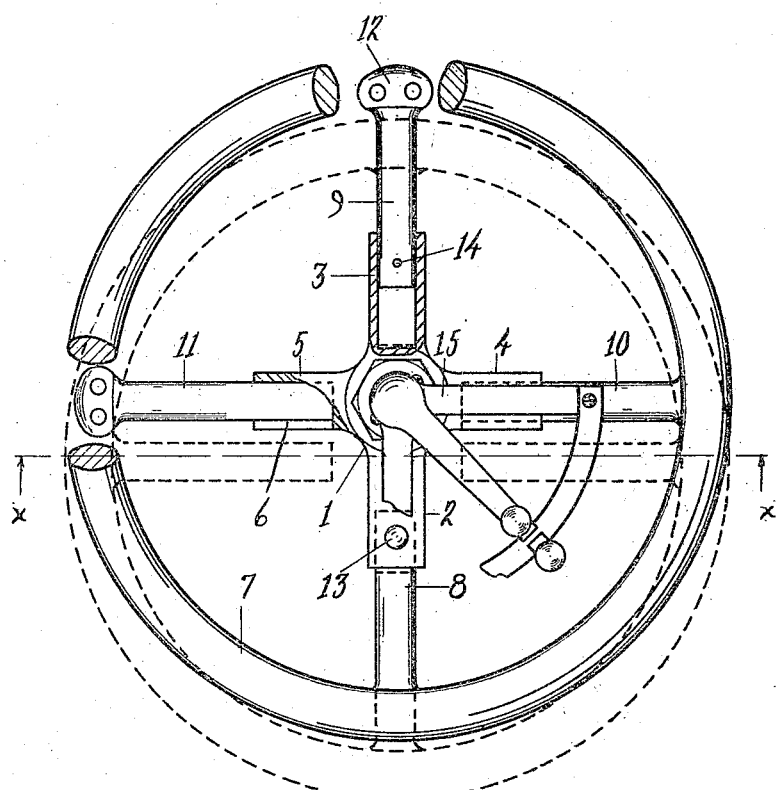
Figure 1 is a plan view of a steering wheel embodying my invention.
Figure 2:
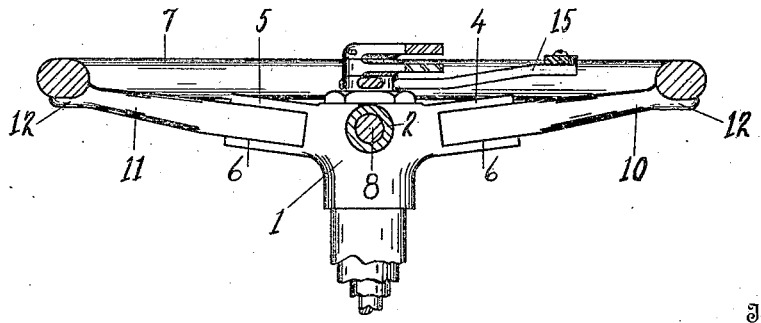
Fig. 2 is a cross section taken on line *x—x* of Fig. 1.

One form of the invention is shown in Fig. 1 in which a head 1 is secured to the steering shaft or post. This head consists of a member provided with radial arms 2, 3, 4, and 5. The arms 2 and 3 are tubular in character while the arms 4 and 5 have the lower side thereof open or slotted as indicated at 6. The wheel rim 7 has secured thereto arms 8, 9, 10, and 11. These arms may be secured to the rim in any approved manner, for instance as shown by means of a flattened end 12 adapted to be secured to the rim by screws in the usual manner. The rim is shown broken away at the upper end and left hand side of the figure to illustrate this construction. These arms 9, 10, etc., are positioned at a right angle, one to another, corresponding to the angle of the arms of the head and extend toward the center of the wheel rim terminating considerably short thereof as shown, so that the rim, when removed, has the short arms only attached and thus is light in weight and easily carried.

The arms 8 and 9 are adapted for telescopic relation with the arms 2 and 3 respectively of the head, and to attach the wheel and arms to the head the arm 9 is first inserted in the end of the arm 3 and moved downward therein practically to the limit of movement at the bottom of the recess in the arm 3. This movement of the rim brings the arms 10 and 11 below and to one side of corresponding arms 4 and 5 of the head and also brings the end of the arm 8 beyond the end of the arm 2 of the head. In passing the arm 9 into the arm 3 as stated, the arms 10 and 11 of the wheel pass beneath the arms 4 and 5, there being sufficient flexibility of the rim and arms to allow such movement, and when brought to lowermost position as shown in dotted lines in Fig. 1 the side of the wheel at the lower side of the figure is moved upward to introduce the arm 8 into the arm 2 and the ends of the arms 10 and 11 through the slots 6 to the position shown in full lines in Fig. 1. The thumb screw 13 shown in the arm 2 is then turned to engage the end of the arm 8 which is notched or recessed to receive the end of the screw after the manner shown at 14 in the arm 9. By these screws, of which one or more may be used, the arms are secured in operative relationship with the arms of the head and the wheel may be used in the usual manner to turn the steering shaft. In the arrangement shown the principal strain of steering is taken by the arms 2 and 3. Rotary movement in one direction also causes the arm 10 to engage against the back of the arm 4 and movement in the other direction causes the arm 11 to engage against the arm 5 materially assisting in the turning of the head. By use of thumb screws in the arms 4 and 5 the said arms 10 and 11 may be secured more solidly in place.

To remove the wheel from the head, the said screws are released and the wheel moved downward which withdraws the arms 8, 10, and 11 from the respective arms of the head whereupon the wheel may be depressed slightly to bring the wheel arms out alinement of the head arms and by pushing upward the arm 9 may be withdrawn from the arm 3. Removal of the rim and attached stub arms from the head prevents use of the vehicle by one unpossessed of a wheel adapted for coöperative use with the head.

It is to be noted that a quadrant 15 is provided which is fixedly attached to the end of the steering post carrying the usual control levers. The control levers are unaffected by the removal of the wheel rim. Thus no parts of the operating mechanism except the steering apparatus are disarranged by the removal of the wheel. The only thing required to securely lock the wheel against use is the removal of the wheel rim and the attached arms.

Figure 3:
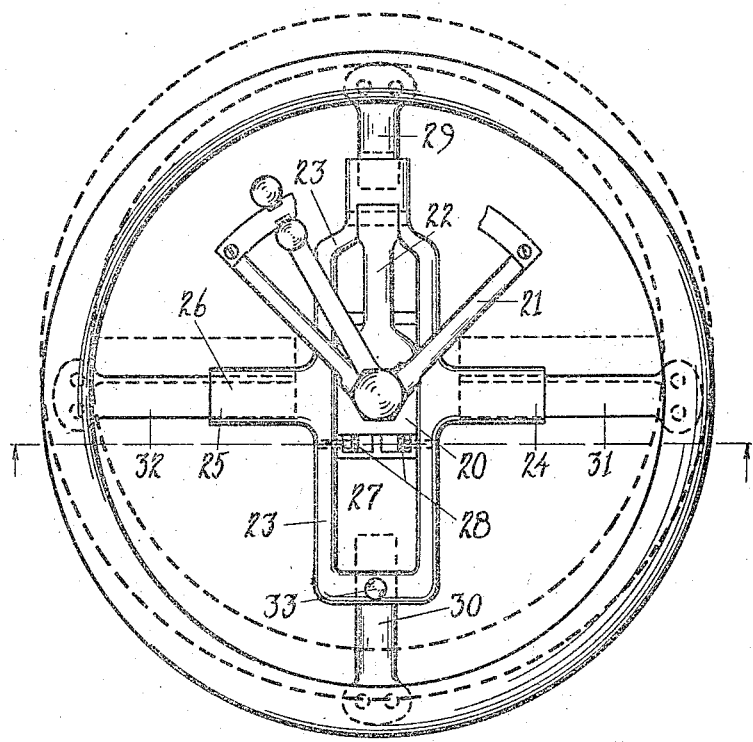
Fig. 3 is a plan view of another common type of a wheel embodying my invention.

There are various types of steering wheels on the market some of which are slidable relative to the steering shaft, and some of which are hinged relative thereto. An example of the latter type is shown in Fig. 3 in which a head 20 is secured to the end of the shaft which also carries the usual quadrant 21 in fixed relation with the head. To this head or extension 22 thereof is hingedly secured a spider 23 which is provided with arms 24 and 25 with sides thereof preferably slotted on the upper side 26. The part of the spider directly hinged to the arm 22 has a rectangular aperture 27 allowing it to swing downward transversely of the steering post and is held in position relative to the fixed part of the head by the pins 28 or equivalent mechanism. The upper end of this rectangular portion has an aperture at the end thereof to receive the end of the stub arm 29 of the wheel rim. The opposite end of this rectangular portion is apertured to receive the stub arm 30. The wheel rim is also provided with arms 31 and 32 for engagement with the arms 24 and 25 of the spider. A thumb screw 33 is provided to secure the shaft 30 in place and the other arms may also be provided with similar screws if desired. To remove this wheel from the spider, the thumb screws are released and the wheel moved upward withdrawing the stub arm 29 from the end aperture in the rectangular portion 27 which also moves the arms 31 and 32 out of the sockets 24 and 25 through the slots 26. This movement also moves the shaft 30 farther through the aperture provided in the lower portion of the hinged part of the head after removal of the arms 29, 31, and 32, the wheel may be moved downward after depressing or raising the said arms out of alinement with the respective head arms 30 withdrawn from the spider.

It is evident from the above description that the invention in either type of wheel described is practically the same, involving a central member secured to the steering post either in fixed or movable relation, is provided with arms to receive the stub arms of the steering wheel adapted to be secured together in driving relation. It is also evident that the expense of construction of the wheel in this described form is not great and that the wheel may be very readily removed or attached to the steering wheel head without disarranging any of the control levers or other parts connected with the head or the shaft.

Having thus fully described my invention what I claim is—

1. In a motor vehicle, a steering post, a head therefor provided with arms, a steering wheel rim provided with corresponding arms, a pair of diametrically opposite arms of the head being adapted to receive the corresponding arms of the rim longitudinally thereof and the opposite arms of the head being adapted to receive corresponding arms of the rim transversely of the axis.

2. In a motor vehicle, a steering post, a head attached thereto having radial arms, a steering wheel having similar radial arms extending toward and terminating short of the center, two diametrically opposite arms on the head being adapted to receive the corresponding arms of the rim by movement of the rim in a direction longitudinally of the axis of the said arms, the other two arms of the head having a slot upon one side to allow movement of the corresponding rim arms thereinto on final movement of the rim in inserting said first named arms, and means for detachably securing the arms in position.

3. In a motor vehicle, a steering post, a head therefor by means of which the post may be turned, the head having oppositely disposed hollow arms open on one side, and having a second pair of arms at right angles thereto provided with apertures in the ends, a steering wheel having four radial arms at a right angle one to the other, adapted to be secured in the arms of the head by first inserting one arm in one of the said apertured ends and moving the wheel to force the arm beyond its normal position therein and bring the opposite arm to alinement with the opposite apertured arm of the head, then by reverse movement to insert the said second named arm and the two remaining arms of the wheel into position in the respective arms of the head.

4. In a motor vehicle, a steering post, a head therefor having a fixed and a movable part, the movable part having radial arms, a steering wheel also having radial arms extending toward but short of the center adapted to be secured to the radial arms of the head, and means for securing the said arms in fixed relation.

5. In a motor vehicle, a steering post, a head therefor having four radial arms, two of the said arms in opposite relation being tubular in form and the two opposite arms having a slot-like opening through one side, a steering wheel having an equal number of arms extending toward but short of the center adapted to be assembled with the head by first introducing one of the rim arms in a tubular arm and drawing it downward beyond the normal position to bring the opposite arm and the other pair of wheel arms to alinement with the respective arms of the head whereby on movement of the wheel in the opposite direction the wheels and arms are introduced in the head arms, and means for detachably securing the arms in fixed relation.

In testimony whereof I sign this specification.

PAUL TURNER.

Copies of this patent may be obtained for five cents each, by addressing the "Commissioner of Patents, Washington, D. C."